United States Patent [19]

Mohr et al.

[11] 4,404,114
[45] Sep. 13, 1983

[54] ACRYLATE/SILICATE CORROSION INHIBITOR

[75] Inventors: Paul H. Mohr, Chappaqua; William N. Matulewicz, Montgomery, both of N.Y.

[73] Assignee: Union Carbide Corporation, Danbury, Conn.

[21] Appl. No.: 389,394

[22] Filed: Jun. 17, 1982

[51] Int. Cl.³ .................. C09K 5/00; C23F 11/12; C23F 11/14; C22F 11/12
[52] U.S. Cl. ......................... 252/75; 62/DIG. 20; 106/14.13; 106/14.15; 106/14.17; 208/42; 252/68; 252/78.3; 252/389 R; 252/392; 252/396; 422/13; 422/16; 422/17; 422/18
[58] Field of Search ............. 252/389 R, 75, 68, 78.3, 252/181, 392, 396; 62/DIG. 20, 85; 106/14.15, 14.13, 14.17, 14.42, 14.44; 208/47; 422/13, 16, 18, 17

[56] References Cited

U.S. PATENT DOCUMENTS

| | | | |
|---|---|---|---|
| 2,692,860 | 10/1954 | Barker et al. | 252/75 |
| 3,418,354 | 12/1968 | Wheeler et al. | 528/24 |
| 3,672,821 | 6/1972 | Schlussler et al. | 422/13 |
| 3,948,792 | 4/1976 | Watsön et al. | 252/389 R |
| 3,950,398 | 4/1976 | Klein | 106/14.15 |
| 4,018,702 | 4/1977 | Boffardi et al. | 252/389 R |
| 4,146,488 | 3/1979 | Martin | 252/34.7 |

Primary Examiner—Irwin Gluck
Attorney, Agent, or Firm—Dale Lynn Carlson

[57] ABSTRACT

An aluminum corrosion inhibitor composition comprising an aqueous and/or alcohol solution of a polymerizable-acid graft copolymer plus at least one organic and/or inorganic silicate, together with a method for using such composition.

35 Claims, No Drawings

ACRYLATE/SILICATE CORROSION INHIBITOR

BACKGROUND OF THE INVENTION

Acrylic acid grafted polymers are known in the art. By way of illustration, U.S. Pat. No. 4,146,488 discloses metal lubricant compositions containing poly(oxyalkylene) compounds grafted with about 3 to 15% by weight of acrylic or methacrylic acid followed by neutralization with alkanolamine. That patent discloses at column 7, lines 50 to 68 and column 8, lines 1 to 15, that such a polymer, when used in aqueous monoethanolamine borate solution is effective in providing cast iron corrosion protection.

Co-pending U.S. application Ser. No. 335,614 discloses that aqueous and/or alcohol solutions of a certain class of such polymers have a particularly beneficial effect in inhibiting aluminum corrosion, most notably with respect to an aggressive form of aluminum corrosion, namely that which occurs at "heat rejecting" aluminum surfaces such as solar panels and the cylinder heads and blocks of internal combustion engines. This finding is particularly significant in view of the fact that there is increasing reliance on the use of aluminum components in the manufacture of heat transfer systems, such as those in solar and automotive systems, as part of an overall trend toward weight reduction.

OBJECT OF THE INVENTION

It is an object of the present invention to provide an aluminum corrosion inhibitor composition comprising an aqueous and/or alcohol solution of a polymerizable-acid graft copolymer plus at least one organic and/or inorganic silicate, together with a method for using such composition.

This and other objects will become apparent from a reading of the following detailed specification.

SUMMARY OF THE INVENTION

In one aspect, the present invention relates to an aluminum corrosion inhibitor composition that is useful inter alia in heat transfer systems such as those found in solar and automotive systems. When used in an automobile, the composition can be added directly to the automobile coolant system via the radiator filler neck as is done with conventional antifreezes.

The composition of the present invention comprises:
(a) alcohol or water or mixtures thereof,
(b) a polymerizable-acid graft copolymer comprising an unsaturated grafting acid (such as an acid selected from the group consisting of acrylic, methacrylic, crotonic and maleic acids), and having a percent acid graft of up to about 60%, and a base polymer consisting of a poly(oxyalkylene) compound of the formula:

$R''((OC_nH_{2n})_zOR')_a$ wherein R' is a member selected from the group consisting of a hydrocarbon radical, a hydrogen atom, or an acyl radical and R'' is a member selected from the group consisting of a hydrocarbon radical, a hydrogen atom, an amine-containing radical, or an acyl radical, a is an integer having a value of 1 to about 4, n has a value of 2 to 4 inclusive, z is an integer having a value of from 4 to 2300 inclusive, and preferably 8 to about 230, said base polymer having a number average molecular weight of between about 200 and 100,000, and (c) an organic and/or inorganic silicate
and wherein the amount of component (b) is between greater than about 0.01 wt. % and about 20 wt. % (preferably from about 0.1 wt. % to about 15 wt. %), based on the total amount of component (a) plus component (b) in said composition, and wherein the weight ratio of component (b) to component (c) ranges from 8000:1 to 1:20 (preferably 200:1 to 1:1.5) based on the amount of silicon in component (c). The above specified limits on percent graft of the graft copolymer, molecular weight of the base polymer and relative amounts of components (a), (b) and (c) are deemed to define the operable limits within which an effective aluminum corrosion inhibitor composition within the scope of the present invention is provided. When operating below the minimum specified limits on components (b) and (c), effective aluminum corrosion inhibition cannot be expected and, when operating above the maximum specified amounts, undesirable physical (e.g. viscosity) changes in the composition are likely to occur.

In another aspect, the polymerizable-acid graft copolymer can, if desired, be partially or wholly neutralized with any base to provide any desired pH for the corrosion inhibitor composition, and such neutralization is preferred. Such neutralization can take place before or after addition of the graft copolymer to form the concentrate or solution of the invention.

In yet another aspect, the invention encompasses methods for making the above composition, either by direct addition of the polymerizable-acid grafted copolymers and silicate to water and/or alcohol or by adding the water and/or alcohol to the acid grafted copolymers and silicate or by pre-forming a composition concentrate. In a preferred embodiment of the invention, the optional neutralization is effected prior to silicate addition to form the concentrate. The corrosion inhibitor composition can be made from the composition concentrate by dilution of the concentrate with water and/or alcohol at the use site. In the concentrate, the amount of component (b) employed is between greater than about 0.01 wt. % and about 20 wt. % based on the total amount of component (a) plus component (b) in said composition, and the weight ratio of component (b) to component (c) ranges from 8000:1 to 1:20 based on the amount of silicon in component (c).

DETAILED DESCRIPTION OF THE INVENTION

The weight ratio of alcohol to water in the composition of the present invention can vary over a wide range. Such mixture can have a water to alcohol weight ratio ranging from 100:0 to 0:100.

The poly(alkylene oxide) compounds used to make the graft copolymers are known in the art. These are commonly produced by reacting an alkylene oxide or a mixture of alkylene oxides, added sequentially or in combination, with water, an alcohol, an amine, and/or an alkanolamine. Such alcohols can be monohydric or polyhydric and correspond to the formula $R''(OH)_a$ wherein R'' and "a" are as defined above. Such alcohols include methanol, ethanol, propanol, butanol, ethylene glycol, glycerol, the monoethylether of glycerol, the dimethyl ether of glycerol, sorbitol, 1,2,6-hexanetriol, trimethylolpropane, and the like, and such alkanolamines include ethanolamine, diethanolamine, monopropanolamine, and the like.

Generally, the poly(oxyalkylene) compounds used in this invention have molecular weights (number average) in the range of about 200 to about 100,000, preferably from 400 to about 10,000.

The grafting of the polymerizable-acid onto the poly(oxyalkylene) compounds can be carried out by free radical polymerization as is known in the art, to afford a grafted acid content of up to about 60%, (preferably between about 1% and about 60%, more preferably between about 5% and 20% graft). Any percent graft, no matter how small, is seen to provide corrosion inhibition advantages within the scope of the present invention. However, when using a grafted copolymer having greater than about 60% graft, an unduly high viscosity for the grafted copolymer is likely.

Although useful grafting acids include, among others, acrylic, methacrylic, crotonic, maleic acids, vinylsulfonic acid, vinylphosphonic acid or mixtures thereof, preferred acids include acrylic and maleic acids, (more preferably acrylic acid).

As used herein, the term "polymerizable-acid" is intended to encompass hydrolyzable precursors such as acrylonitrile, ethyl acrylate, methylmethacrylate, ethyl maleate, bis-(2-chloroethyl)vinylphosphonate, bis-(2-chloroethyl)vinylsulfonate, or mixtures thereof, and the like. In the copolymer, these reacted precursors may be hydrolyzed and neutralized in situ in the alkaline aqueous environment of the cooling system.

The preferred poly(oxyalkylene) compounds useful in the present invention are the well-known poly(oxyethylene-oxypropylene) polymers, having a weight ratio of oxyethylene ("EO") to oxypropylene ("PO") of between 0:100 and 100:0.

As mentioned above, the acid graft copolymers useful in the present invention can, if desired, be conveniently partially or wholly neutralized with base to provide the salt of the acid graft copolymer. It is preferred that the acid graft copolymers be wholly neutralized for use in the present invention. Illustrative bases would include the following (although any known base can be used): ammonium hydroxide, alkali metal hydroxides, or alkaline earth metal hydroxides; or amines, such as amines of the formula:

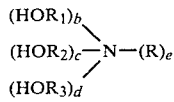

wherein R is hydrogen or alkyl having 1 to about 6 carbon atoms, each of $R_1$, $R_2$, and $R_3$ is an alkylene radical having 2 to 4 carbon atoms, e has a value of 0, 1, 2 or 3 and b, c, and d each have a value of 0 or 1, with the proviso that when b, c, and d each have a value of 1, then e is 0.

When an alkanolamine is employed, the preferred alkanolamine is a trialkanolamine but mono- and di-alkanolamines, or mixtures thereof, can also be used. The preferred trialkanolamine is triethanolamine although others, such as, trimethanolamine, tripropanolamine, tributanolamine, and the like, can also be used if desired. Exemplary monoalkanolamines include monoethanolamine, monopropanolamine and substituted monoalkanolamines such as, N-methyl ethanolamine, N,N-dimethylethanolamine, N,N-diethylethanolamine, N,N-diethylpropanolamine, and the like. Exemplary dialkanolamines include diethanolamine, dibutanolamine and substituted dialkanolamines such as, N-methyl diethanolamine, N-ethyl diethanolamine, and the like.

Other useful amines include triethylamine, di-n-propylamine, tri-n-propylamine, n-butylamine, n-amylamine, di-n-amylamine, n-hexylamine, ethylenediamine, propylenediamine, ethylamine, cyclohexylamine, dicyclohexylamine, ethylhexylamine, N-ethyl aniline, morpholine ethanol, 1-(N-methyl)-aminohexane-2,3,4,5,6-pentol, and mixtures of mono-, di-, and tri-n-alkylamines. A commercial mixture of amyl amines consisting of about 60 percent mono-n-amylamine and about 40 percent di-n-amylamine can be used, although a wide variety of other commercial amines can suitably be employed.

The organic and inorganic silicates useful in the present invention include alkali metal salts of silicates, alkanolamine salts of silicates, and numerous hydrocarbon orthosilicates including alkyl silicates such as methyl silicate, ethyl silicate, butyl silicate and amylsilicates; aryl silicates such as benzyl and tolyl silicates; mixed alkyl silicates such as methyl ethyl silicate; mixed aryl silicates such as benzyl tolyl silicate; mixed alkyl aryl silicates such as methyl benzyl silicate and ethyl tolyl silicate; glycol silicates such as ethylene glycol silicate and propylene glycol silicate; and polyhydroxy alcohol silicates such as glycerol silicate and pentaerythritol silicate; and mixtures of the above.

Optional additives may be employed in minor amounts of less than 50 wt. percent based on the weight of the aqueous composition. Typical optional additives would include, for example, known corrosion inhibitors for aluminum or other metals in admixture with the silicates and the polymerized-acid graft copolymer useful in corrosion inhibition such as, for example, molybdates, borates, phosphates and benzoates, hydroxy benzoates or acids thereof, silicones (such as those disclosed in U.S. Pat. No. 3,337,496, incorporated herein by reference), alkali metal nitrates, alkali metal nitrites, diisopropylamine nitrite, dicyclohexylamine nitrate, tolyltriazole, mercaptobenzothiazole, benzotriazole, and the like, or mixtures thereof. If one or more of the known inhibitors are employed together with the inhibitors of the present invention, the sum total of all inhibitors should be used in an "inhibitory effective amount", i.e., an amount sufficient to provide some corrosion inhibition with respect to the aluminum surfaces to be protected. Other typical optional additives would include wetting agents and surfactants such as, for example, known ionic and non-ionic surfactants such as the poly(oxyalkylene) adducts of fatty alcohols; antifoams and/or lubricants such as the well-known polysiloxanes and the polyoxyalkylene glycols, as well as any other minor ingredients known in the art that do not adversely affect the aluminum corrosion resistance sought to be achieved.

Although not wishing to be bound by any particular theory, the compositions of the present invention appear to exhibit enhanced aluminum corrosion inhibition due to a synergistic interaction between the silicate and the polymerizable-acid graft copolymer in the composition.

As used herein, the term "percent acid graft" designates such graft on a weight basis.

The following example is intended to illustrate, but in no way limit the present invention.

EXAMPLE 1

A. Preparation of Acid Graft Copolymer

An acid graft copolymer within the scope of the present invention was prepared using acrylic acid and a base polymer consisting of butanol started poly(oxyethylene-oxypropylene) copolymer having a number average molecular weight of 4000 and a viscosity of 5100 Saybolt seconds at 100° F. as follows:

Into a 5-liter, 3-neck round bottom flask fitted with a water condenser, thermocouple, stirrer, and means of introducing acrylic acid and catalyst, was placed 899 gms of the polymer. By means of a heating mantle, the flask was heated to a temperature of 150° C., followed by the addition of 11 grams of tertiary-butyl perbenzoate and 100 grams of acrylic acid. The peroxide feed was begun 15 minutes prior to starting the acid feed and both ingredients were fed over a period of 135 minutes after which the product (herein called "Grafted Copolymer A") was allowed to cool to room temperature. Graft copolymer A prepared in accordance with the above procedure had properties as set forth in Table I below. The "% Graft" for the grafted copolymers of Table I was calculated on the basis of the total amount of grafting acid fed into the reaction mixture.

TABLE I

| Grafted Copolymer | Grafted Acid | % Graft | Starter | Properties of Base Polymer | | Viscosity (Saybolt sec. at 100° F.) |
| --- | --- | --- | --- | --- | --- | --- |
| | | | | % EO/PO | Mol. Wt. | |
| A | acrylic | 10% | butanol | 50/50 | 4000 | 5100 |

The above acid grafted copolymer was tested in solution employing the following formulation:

| FORMULATION | |
| --- | --- |
| COMPONENT | Wt. % |
| Ethylene glycol | 90.9273 |
| Boric Acid | 0.4048 |
| 75% $H_3PO_4$ | 1.6877 |
| 45% KOH | 3.8802 |
| Total Wt. % | 96.9000 |

To the above formulation was added the individual acid grafted copolymer and silicate in an amount as specified in Table II below. Additional ethylene glycol was then added as required to provide 100 wt. percent of a concentrate.

The concentrates were diluted to make working solutions by mixing 33 wt. % of concentrate with 67 wt. % of "corrosive water" (deionized water containing 300 ppm. each of $SO_4^=$, $HCO_3^-$ and $Cl^-$, all added as the Na salts).

B. Laboratory Disc Heat Flux Test: Method, Apparatus and Results

A test method used in the industry was employed to determine the inhibitory effect of the formulated composition of the present invention with respect to heat rejecting aluminum surfaces. This test method is described in *Corrosion*, 15 257t at 258t (1959) Laboratory Methods for Determining Corrosion Rates Under Heat Flux Conditions and also in an ASTM textbook entitled, "Engine Coolant Testing: State of the Art," a symposium sponsored by ASTM Committee D-15, at pages 17-19 (Printed, May 1980), both incorporated herein by reference. A summary of the test equipment and procedure follows:

The apparatus consists of a 1 liter flask, fitted with a condenser, a thermometer, a cold finger, a temperature controller, a 1½ inch diameter×¼ inch thick No. 319 aluminum casting alloy (herein "the aluminum disc"), and a soldering iron heat source.

The apparatus was charged with 750 ml. of test solution and heated to effect boiling at the aluminum disc surface and to maintain a solution temperature of 90° C. The test duration was 168 hours. The weight loss of aluminum from the aluminum disc was determined and used as a measure of corrosion inhibitor effectiveness.

The results are given in Table II which follows:

TABLE II

| Test Solution | Wt. % Copolymer A | ppm Si as Silicate | Wt. Loss (mg.) | % Inhibition* |
| --- | --- | --- | --- | --- |
| 1 | — | — | 786 | 0 |
| 2 | 0.5 | — | 599 | 43 |
| 3 | — | 25 | 625 | 20 |
| 4 | 0.5 | 25 | 27 | 91 |

*% Inhibition is calculated as follows:
$$\frac{\text{Wt. loss of control (\#1)} - \text{wt. loss of (\#2, 3 or 4)}}{\text{Wt. loss of control (\#1)}} \times 100$$

It is surprising that the wt. loss for test solution #4 is far lower than would be expected by virtue of the individual inhibition effects of copolymer A (Test solution #2) plus silicate (Test solution #3).

I claim:

1. An aluminum corrosion inhibitor composition concentrate comprising;
   (a) alcohol or water or mixtures thereof;
   (b) a polymerizable-acid graft copolymer comprising an unsaturated grafting acid and having a percent acid graft of up to about 60% and a base polymer consisting of a poly(oxyalkylene) compound of the formula: $R''((OC_nH_{2n})_zOR')_a$ wherein R' is a member selected from the group consisting of a hydrocarbon radical, a hydrogen atom, or an acyl radical and R'' is a member selected from the group consisting of a hydrocarbon radical, a hydrogen atom, an amine-containing radical, or an acyl radical, a is an integer having a value of 1 to about 4, n has a value of 2 to 4 inclusive, z is an integer having a value of from 4 to 2300 inclusive, said base polymer having a number average molecular weight of between about 200 and about 100,000, and
   (c) a silicate selected from the group consisting of organic silicates, inorganic silicates, and mixtures thereof, and wherein the amount of component (b) is between greater than about 0.01 wt. % and about 20 wt % based on the total amount of component (a) plus component (b) in said concentrate, and wherein the weight ratio of component (b) to component (c) ranges from 8000:1 to 1:20 based on the amount of silicon in component (c).

2. The concentrate of claim 1 to which additionally is added:
   (d) ammonium hydroxide, alkali metal hydroxides, or alkaline earth metal hydroxides; or amines, or mixtures thereof.

3. The concentrate of claim 2 wherein component (d) is sodium or potassium hydroxide or triethanolamine, or mixtures thereof.

4. The concentrate of claim 1 wherein component (b) is soluble in component (a) to the extent of at least about 0.01 weight percent based on the weight of the concentrate.

5. The concentrate of claim 4 wherein component (a) is ethylene glycol.

6. The concentrate of claim 2 wherein the reaction product of component (b) and component (d) is soluble in component (a) to the extent of at least about 0.01 weight percent based on the weight of the concentrate.

7. The concentrate of claim 2 wherein the reaction product of component (b) and component (d) is insoluble in component (a).

8. The concentrate of claim 1 wherein component (b) is insoluble in component (a).

9. The concentrate of claim 4 wherein component (a) is ethylene glycol, said base polymer is a poly(oxyethylene-oxypropylene) compound having a number average molecular weight between 400 and 10,000, component (d) is sodium hydroxide, and said percent graft is between about 5% and about 20%.

10. The concentrate of any of claims 1 to 9 wherein component (c) is selected from the group consisting of hydrocarbon orthosilicates, alkali metal salts of silicates and alkanolamine salts of silicates.

11. An aluminum corrosion inhibitor composition comprising:
   (a) alcohol, water, and mixtures thereof,
   (b) a polymerizable-acid graft copolymer comprising an unsaturated grafting acid and having a percent acid graft of up to about 60% and a base polymer consisting of a poly(oxyalkylene) compound of the formula: $R''((OC_nH_{2n})_zOR')_a$ wherein $R'$ is a member selected from the group consisting of a hydrocarbon, a hydrogen atom, or an acyl radical and $R''$ is a member selected from the group consisting of a hydrocarbon a hydrogen atom, an amine-containing, or an acyl radical, a is an integer having a value of 1 to about 4, n has a value of 2 to 4 inclusive, z is an integer having a value of from 4 to 2300 inclusive, said base polymer having a number average molecular weight of between about 200 and about 100,000 and
   (c) a silicate selected from the group consisting of organic silicates, inorganic silicates, and mixtures thereof, and wherein the amount of component (b) is between greater than about 0.01 wt. % and about 15 wt. % based on the total amount of component (a) plus component (b) in said composition, and wherein the weight ratio of component (b) to component (c) ranges from 8000:1 to 1:20 based on the amount of silicon in component (c).

12. The composition of claim 11 to which additionally is added:
   (d) ammonium hydroxide, alkali metal hydroxides, or alkaline earth metal hydroxides; or amines.

13. The composition of claim 12 wherein component (d) is sodium or potassium hydroxide or triethanolamine.

14. The composition of claim 11 wherein component (b) is soluble in component (a) to the extent at least about 0.01 weight percent based on the weight of the composition.

15. The composition of claim 14 wherein component (a) is ethylene glycol.

16. The composition of claim 12 wherein the reaction product of component (b) and component (d) is soluble in component (a) to the extent of at least about 0.01 weight percent based on the weight of the composition.

17. The composition of claim 12 wherein the reaction product of component (b) and component (d) is insoluble in component (a).

18. The composition of claim 11 wherein component (b) is insoluble in component (a).

19. The composition of claim 14 wherein component (a) is ethylene glycol, component (c) is sodium hydroxide, said base polymer is a poly(oxyethylene-oxypropylene) compound having a number average molecular weight between 400 and 10,000, and said percent graft is between about 5% and about 20%.

20. The concentrate of any of claims 1 to 9 wherein component (c) is selected from the group consisting of hydrocarbon orthosilicates, alkali metal salts of silicates and alkanolamine salts of silicates.

21. A method for providing aluminum-corrosion inhibition in an aluminum component heat transfer system which comprises filling said system with a composition comprising:
   (a) alcohol or water or mixtures thereof, and
   (b) a polymerizable-acid graft copolymer comprising an unsaturated grafting acid and having a percent acid graft of up to about 60% and a base polymer consisting of a poly(oxyalkylene) compound of the formula: $R''((OC_nH_{2n})_zOR')_a$ wherein $R'$ is a member from the group consisting of a hydrocarbon radical, a hydrogen atom, or an acyl radical and $R''$ is a member selected from the group consisting of a hydrocarbon radical, a hydrogen atom, an amine-containing radical, or an acyl radical, a is an integer having a value of 1 to about 4, n has a value of 2 to 4 inclusive, z is an integer having a value of from 4 to 2300 inclusive, said base polymer having a number average molecular weight of between about 200 and about 100,000 and
   (c) an organic or inorganic silicate and wherein the amount of component (b) is between about 0.01 wt. % and about 15 wt. % based on the total amount of component (a) plus component (b) in said composition, and wherein the weight ratio of component (b) to component (c) ranges from 8000:1 to 1:20 based on the amount of silicon in component (c).

22. The method of claim 21 which comprises the additional step of adding to said composition:
   (d) ammonium hydroxide, alkali metal hydroxides, or alkaline earth metal hydroxides; or amines.

23. The method of claim 22 wherein component (d) is sodium or potassium hydroxide or triethanolamine.

24. The method of claim 21 wherein component (b) is soluble in component (a) to the extent at least about 0.01 weight percent based on the weight of the composition.

25. The method of claim 24 wherein component (a) is ethylene glycol.

26. The method of claim 22 wherein the reaction product of component (b) and component (d) is soluble in component (a) to the extent of at least about 0.01 weight percent based on the weight of the composition.

27. The method of claim 22 wherein the reaction product of component (b) and component (d) is insoluble in component (a).

28. The method of claim 21 wherein component (b) is insoluble in component (a).

29. The method of claim 21 wherein component (a) is ethylene glycol, component (d) is sodium hydroxide, said base polymer is a poly(oxyethylene-oxypropylene) compound having a number average molecular weight between 400 and 10,000, and said percent graft is between about 5% and about 20%.

30. The method of any of claims 21 to 29 wherein component (c) is selected from the group consisting of hydrocarbon orthosilicates, alkali metal salts of silicates and alkanolamine salts of silicates.

31. The method of claim 21 wherein said heat transfer system is a cooling system.

32. The concentrate of claim 1 wherein the amount of component (b) is between about 0.1 wt. % and about 15 wt. % and is based on the total amount of component (a) plus component (b) in said concentrate.

33. The method of claim 21 wherein the amount of component (b) is between about 0.1 wt. % and about 15 wt. % and is based on the total amount of component (a) plus component (b) in said composition.

34. The method of claim 21 wherein the weight ratio of component (b) to component (c) ranges from 200:1 to 1:1.5 based on the amount of silicon in component (c).

35. The concentrate of any of claims 1 to 9 which additionally contains a silicone stabilizer in an amount sufficient to stabilize component (c) in said concentrate.

* * * * *